(12) United States Patent
Hart et al.

(10) Patent No.: US 9,066,525 B2
(45) Date of Patent: Jun. 30, 2015

(54) SHOULDER POSITIONING CONVEYOR

(75) Inventors: Colin Hart, Ankeny, IA (US); Liansuo Xie, Ankeny, IA (US); Doug Bauer, Altoona, IA (US)

(73) Assignee: MAREL MEAT PROCESSING INC., Des Moines, IA (US)

( * ) Notice: Subject to any disclaimer, the term of this patent is extended or adjusted under 35 U.S.C. 154(b) by 0 days.

(21) Appl. No.: 13/547,366

(22) Filed: Jul. 12, 2012

(65) Prior Publication Data

US 2014/0014474 A1 Jan. 16, 2014

(51) Int. Cl.
*B65G 47/74* (2006.01)
*A22C 17/00* (2006.01)

(52) U.S. Cl.
CPC .................................. *A22C 17/0093* (2013.01)

(58) Field of Classification Search
USPC ........ 198/636, 697, 698, 725–735.1; 452/177
See application file for complete search history.

(56) References Cited

U.S. PATENT DOCUMENTS

| | | | | |
|---|---|---|---|---|
| 2,306,773 A | * | 12/1942 | Biffinger | 452/53 |
| 2,642,176 A | * | 6/1953 | De Burgh | 198/721 |
| 3,571,845 A | * | 3/1971 | Martin et al. | 452/63 |
| 4,354,296 A | * | 10/1982 | Robinson | 452/53 |
| 4,570,295 A | * | 2/1986 | van Mil | 452/182 |
| 4,597,136 A | * | 7/1986 | Hazenbroek | 452/169 |
| 5,098,333 A | * | 3/1992 | Cobb | 452/106 |
| 5,176,563 A | | 1/1993 | Ven Den Nieuwelaar et al. | |
| 5,334,083 A | * | 8/1994 | van den Nieuwelaar et al. | 452/106 |
| 6,033,299 A | * | 3/2000 | Stone et al. | 452/182 |
| 6,668,730 B2 | * | 12/2003 | Goldbeck | 104/162 |
| 7,059,954 B2 | * | 6/2006 | Annema et al. | 452/136 |
| 7,662,034 B2 | | 2/2010 | Van Hillo et al. | |
| 8,500,523 B1 | * | 8/2013 | Hart et al. | 452/154 |
| 8,647,181 B2 | * | 2/2014 | Cornelissen et al. | 452/53 |
| 2008/0171506 A1 | * | 7/2008 | Nieuwelaar et al. | 452/167 |
| 2010/0151779 A1 | * | 6/2010 | Bakker | 452/71 |
| 2010/0323599 A1 | | 12/2010 | Hiddink et al. | |

FOREIGN PATENT DOCUMENTS

| | | |
|---|---|---|
| EP | 1097644 A1 | 5/2001 |
| EP | 2550866 A1 | 1/2013 |
| WO | 2007/147412 A1 | 12/2007 |

* cited by examiner

*Primary Examiner* — William R Harp
(74) *Attorney, Agent, or Firm* — Zarley Law Firm, P.L.C.

(57) ABSTRACT

A conveyor for positioning a meat product to be cut having a track attached to a frame, a chain slidably mounted on the track, a plurality of flights connected to the chain and a guide bar connected to the frame wherein the conveyor advances product forward at a loading end, maintains the product in a stable position through a transport section, and releases the product at a discharge end such that the product drops off the guide bar.

12 Claims, 3 Drawing Sheets

SHOULDER POSITIONING CONVEYOR

BACKGROUND OF THE INVENTION

The invention is directed toward a conveying device to position a product to be cut. More specifically, the invention is directed to a conveying device for positioning a meat product in a stable position to allow for subsequent adjustments to cut the product.

Methods for cutting meat products are known in the art. For example, to remove the upper portion of a pork shoulder, conventionally an operator would manually position the shoulder to allow for manual cutting. This method was labor intensive and time consuming.

To improve upon this method, the shoulder was placed onto a transport conveyor and an operator would manually align the shoulder with a projected light beam prior to being transported to a cutting device. While an improvement, this method still required manual labor and is not the most accurate as if one cuts through a bone, the product moves and yield is lost. Therefore, there exists a need for a conveyor that addresses these deficiencies in the art.

An objective of the present invention is to provide a positioning conveyor that provides a more consistent cut.

A further objective is to provide a positioning conveyor that improves yield.

A still further objective is to provide a positioning conveyor that reduces manual labor.

These and other objectives will be apparent to one of ordinary skill in the art based on the following written description, drawings, and claims.

SUMMARY OF THE INVENTION

A conveyor for positioning a meat product to be cut having a track attached to a frame, a chain slidably mounted on the track, a plurality of flights connected to the chain and a guide bar connected to the frame. The conveyor, at a loading end, advances a product forward of its attachment point to a transport conveyor. As the product moves through a transport section, the speed of the positioning conveyor is synchronous to the speed of the transport conveyor so that the product remains stationary. At the discharge end the product is released from the flights and drops off a discharge section of the guide bar.

DETAILED DESCRIPTION OF THE PREFERRED EMBODIMENTS

Figure 1:
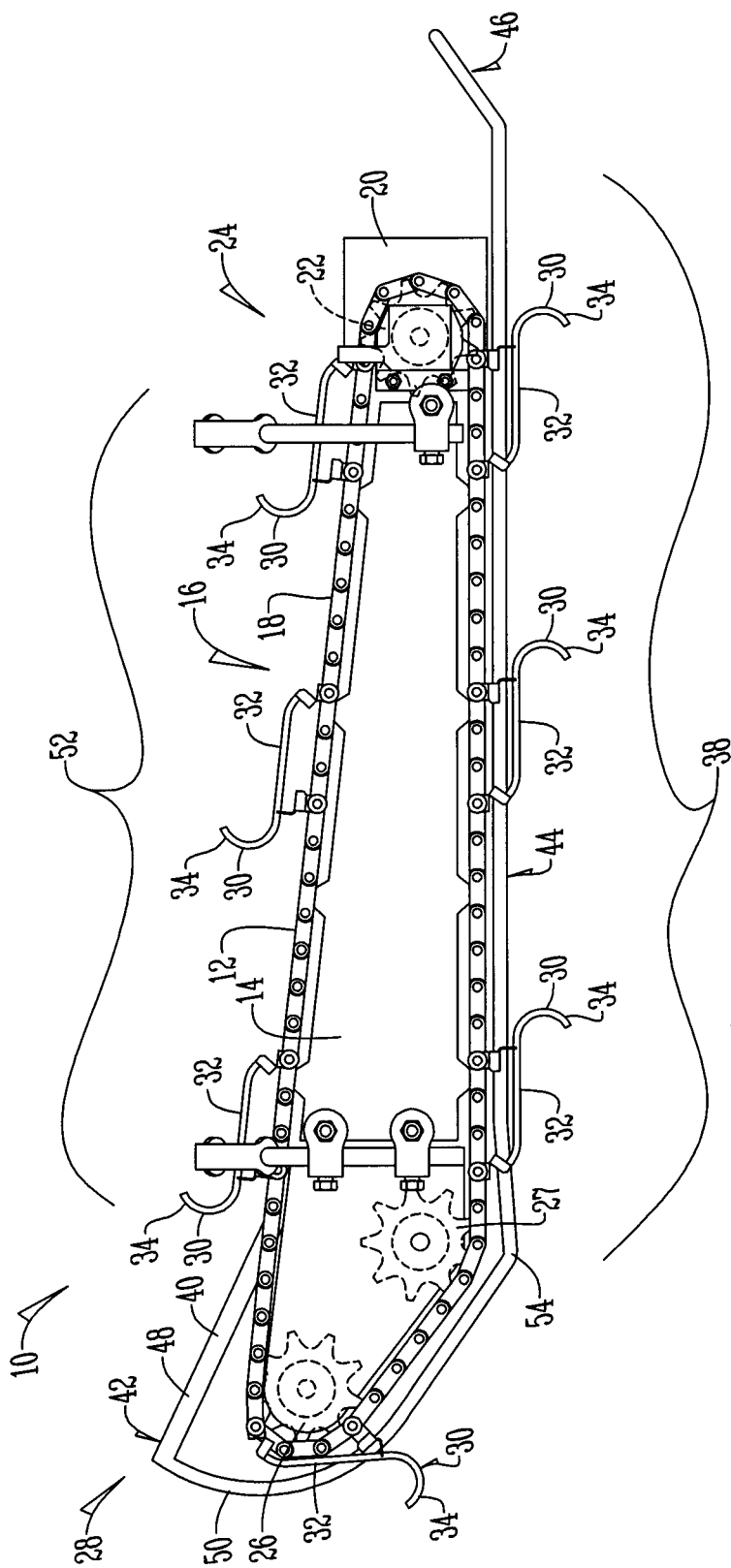
FIG. 1 is a top plan view of a positioning conveyor.
Figure 2:
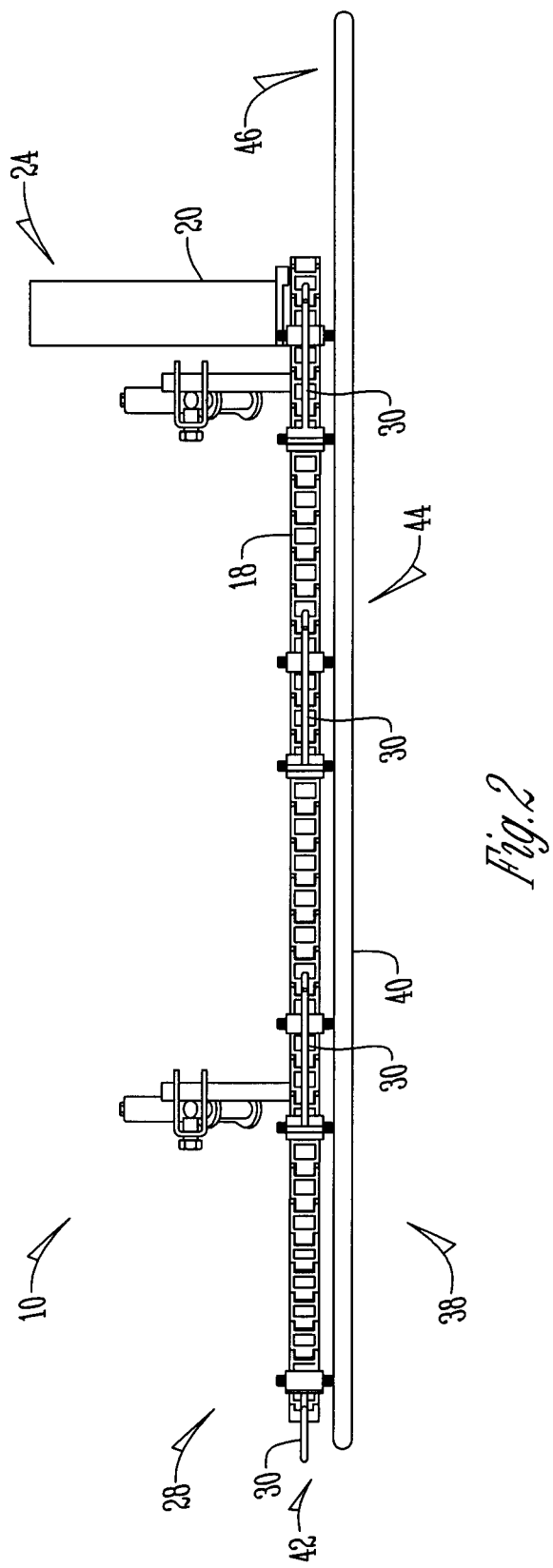
FIG. 2 is a side plan view of a positioning conveyor.
Figure 3:
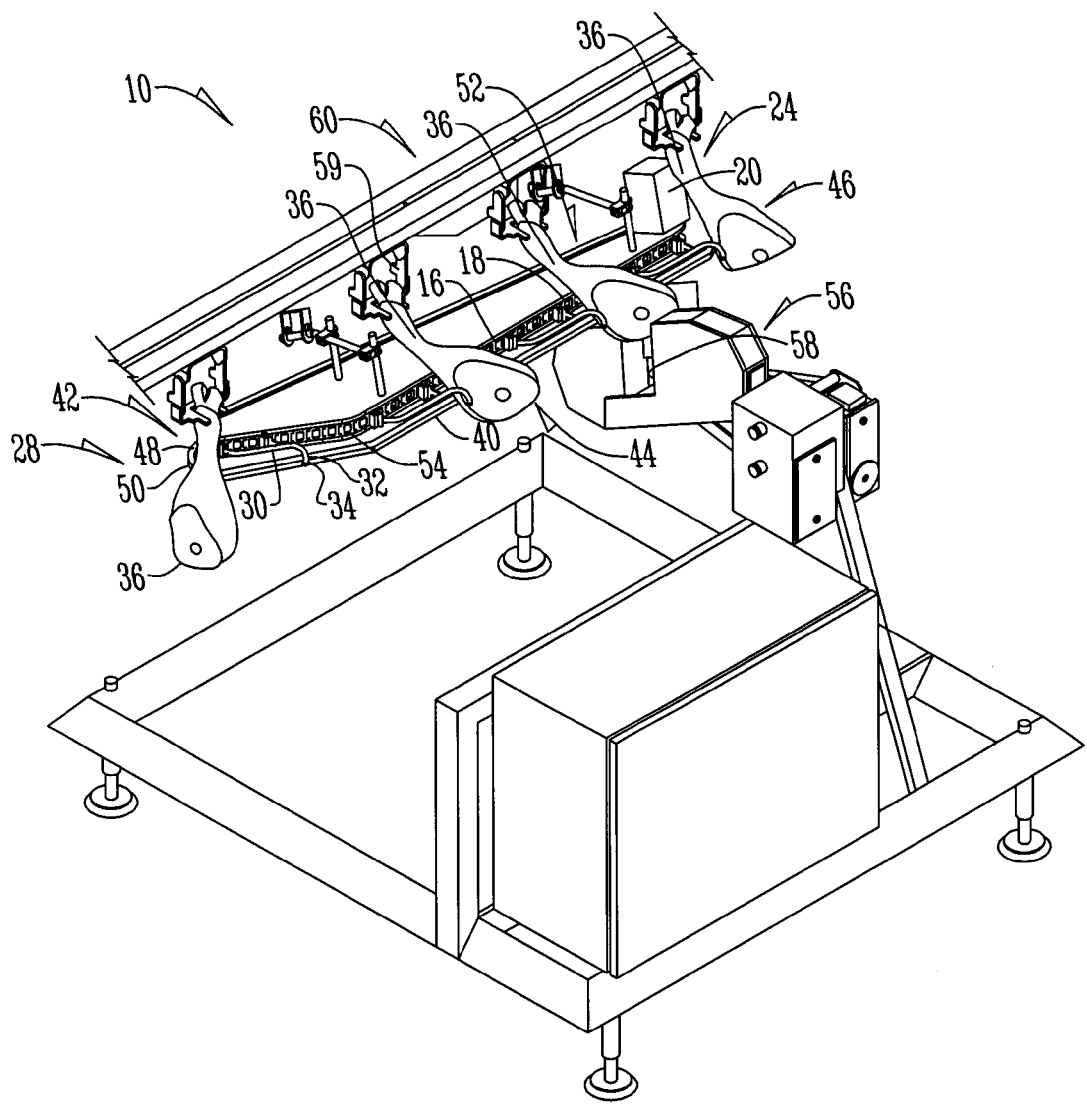
FIG. 3 is a perspective view of a positioning conveyor.

Referring to the Figures, a positioning conveyor 10 has a track 12 mounted to a frame 14. Slidably mounted to the track 12 is a continuous chain 18 that is driven preferably by a servo motor 20. Preferably, the motor 20 is connected to a drive sprocket 22 that is rotatably mounted to the frame 14 at the discharge end 24 of the conveyor 10. A tension sprocket 26 and an idler sprocket 27 are rotatably mounted to the frame 14 at the loading end 28 of the conveyor 10. The drive sprocket 22, tensioning sprockets 26, and idler sprocket 27 engage the chain 18 to cause the chain to rotate along the track 12.

Connected longitudinally to the chain 18 are a plurality of hooks or flights 30. Preferably, the hooks have a generally longitudinal section 32 and an arcuate section 34 and are spaced apart from one another a sufficient length to receive and transport a product 36. While the conveyor 10 is adaptable for many different types of products, as an example only, for the purpose of this disclosure, a pork shoulder is described.

Extending around at least the periphery of the operating section 38 of the conveyor 10 is a guide/support bar 40 that is connected to the frame 14. The guide bar 40 is positioned to engage and support the product 36 to prevent the product 36 from contacting chain 18. In one embodiment, the guide bar 40 has a loading section 42, a transport section 44, and a discharge section 46.

The loading section 42 has a first portion 48 that extends outwardly from the track 12 and beyond the loading end 28 of the conveyor 10 where the first portion 48 terminates into a second portion 50. The second portion 50 is generally arcuate and curves back from the first portion 48 toward the operating section 38 of the conveyor 10.

The transport section 44 extends from the second portion 50 of the loading section 42 in spaced relation to the track 12 and terminates into the discharge section 46 at a point beyond the discharge end 24 of the conveyor 10. The discharge section 46 extends inwardly from the transport section 44 toward a longitudinal axis of the conveyor 10.

While the conveyor is of any shape and structure, preferably the discharge end 24 is arcuate and the track 12 tapers outwardly away from the longitudinal axis of the conveyor 10 on the non-operating side 52 of the conveyor 10 until track 12 reaches the loading end 28. The loading end 28 is likewise arcuate and the track 12 extends at an angle from the loading end 28 to a transition point 54. At the transition point 54, the track 12 extends generally parallel to the center axis of the conveyor 10 until the track reaches the discharge end 24.

In operation, the conveyor 10 is positioned adjacent a cutting device 56, such as a band saw, preferably at a 30 degree angle to the ground, so that the product 36 will be received within the throat 58 of the cutting device 56 during transport at an optimal cut line. In operation, prior to reaching the positioning conveyor 10, the product 36 is attached to a shackle 59 on a transport conveyor 60 for delivering the product 36 to the loading end 28 of the positioning conveyor 10. At the loading end 28, the product engages the arcuate second portion 50 of the loading section 42 of the guide bar 40. As the chain 18 rotates about track 12, the arcuate section 34 of one hook 30 engages the product at the loading end 28. As the hook 30 rotates about the loading end 28, due to the shape of the loading end 28, the hook 30 which is ahead of the attachment on the transport conveyor 60, accelerates the hook 30 and advances the product 36 forward in relation to the shackle 59 on the conveyor 10 and into position for cutting. An encoder, not shown, monitors the position of the transport conveyor 60 such that the positioning conveyor 10 runs at a synchronous speed to the transport conveyor 60 so that the product 36 remains stationary on the positioning conveyor 10. The speed of the positioning conveyor is adjustable by the servo motor 20 in order to adjust the angle of the product 36 from the product's 36 attachment point on the transport conveyor 60 to the product's 36 position on the positioning conveyor 10.

Once positioned, the product 36 is transported through the throat 58 of the cutting device 56 where a portion of the product (i.e., the butt) is cut away and drops to a discharge conveyor (not shown). The remaining attached product 36 continues along the guide bar 40 past the discharge end 24 of the positioning conveyor. Rather than push the product 36 outwardly from the positioning conveyor 10 as the product 36 is transported past the discharge end 24, the product is released from the flight 30 and then drops off the discharge section 46 of the guide bar 40.

Accordingly, a positioning conveyor has been disclosed that, at the very least, meets all the stated objectives.

What is claimed is:

1. A conveyor for positioning a meat product to be cut, comprising:
    a track mounted to a frame;
    a continuous chain slidably mounted to the track;
    a plurality of flights that are hook shaped and longitudinally connected to the chain;
    a guide bar connected to the frame wherein as one flight rotates about a loading end of the conveyor, the one flight engages a product and advances the product forward of an attachment of the product on a transport conveyor.

2. The conveyor of claim 1 wherein the guide bar has a loading section that includes a first portion that extends outwardly from the track and beyond the loading end of the conveyor and a second portion that is generally arcuate and curves back from the first portion toward an operating section of the conveyor.

3. The conveyor of claim 1 wherein the guide bar is positioned to prevent the product from contacting the continuous chain.

4. The conveyor of claim 1 wherein the guide bar is positioned to engage and support the product.

5. The conveyor of claim 1 further comprising a drive sprocket, a tension sprocket, and an idler sprocket are rotatably mounted to the frame and engage the chain.

6. The conveyor of claim 5 wherein the tension sprocket and the idler sprocket are rotatably mounted to the frame at the loading end of the conveyor.

7. The conveyor of claim 1 wherein the shape of the loading end accelerates the flights to advance the product forward in relation to a shackle on the transport conveyor and into position for cutting.

8. The conveyor of claim 1 wherein the flights have a generally longitudinal section that extends horizontally in parallel spaced alignment to the continuous chain.

9. The conveyor of claim 1 wherein the guide bar is positioned below the conveyor.

10. A conveyor for positioning a meat product to be cut, comprising:
    a track mounted to a frame;
    a continuous chain slidably mounted to the track;
    a plurality of flights that are hook shaped and longitudinally connected to the chain; and
    a guide bar connected to the frame and extending around at least the periphery of an operating section of the continuous chain to prevent the product from contacting the continuous chain;
    wherein the positioning conveyor rotates at a speed synchronous to a transport conveyor such that a product remains stationary on the positioning conveyor as the product is transported on a transport section of the guide bar.

11. The conveyor of claim 10 further comprising a servo motor that adjusts the speed of the positioning conveyor in relation to the speed of the transport conveyor.

12. A conveyor for positioning a meat product to be cut, comprising:
    a track mounted to a frame;
    a continuous chain slidably mounted to the track;
    a plurality of flights that are hook shaped and longitudinally connected to the chain; and
    a guide bar connected to the frame having a discharge section that extends inwardly from a transport section of the guide bar toward a longitudinal axis of the positioning conveyor;
    wherein at the discharge end of the positioning conveyor a product is released from the flights and drops off the guide bar.

* * * * *